(12) United States Patent
Obara et al.

(10) Patent No.: US 7,638,083 B2
(45) Date of Patent: Dec. 29, 2009

(54) MOLDING METHOD AND RESIN MOLDINGS

(75) Inventors: Tomoyuki Obara, Ichihara (JP);
Katsuhiko Tada, Ichihara (JP)

(73) Assignee: Prime Polymer Co., Ltd., Tokyo (JP)

( * ) Notice: Subject to any disclaimer, the term of this patent is extended or adjusted under 35 U.S.C. 154(b) by 606 days.

(21) Appl. No.: 10/530,713

(22) PCT Filed: Oct. 7, 2003

(86) PCT No.: PCT/JP03/12832

§ 371 (c)(1),
(2), (4) Date: Sep. 16, 2005

(87) PCT Pub. No.: WO2004/033184

PCT Pub. Date: Apr. 22, 2004

(65) Prior Publication Data

US 2006/0110576 A1    May 25, 2006

(30) Foreign Application Priority Data

Oct. 8, 2002    (JP) .............................. 2002-294699

(51) Int. Cl.
  *B29C 45/00* (2006.01)
  *B29C 71/02* (2006.01)
  *B29C 41/46* (2006.01)
  *B29C 45/72* (2006.01)
(52) U.S. Cl. .................. 264/328.18; 264/235; 264/257
(58) Field of Classification Search ................ 264/257, 264/904, 235, 328.18, 346
See application file for complete search history.

(56) References Cited

U.S. PATENT DOCUMENTS 4,439,492 A    3/1984    Wada et al.

FOREIGN PATENT DOCUMENTS

| EP | 0 364 803 | 4/1990 |
|---|---|---|
| EP | 0 623 448 | 11/1994 |
| EP | 0 736 366 | 10/1996 |
| EP | 0 908 292 A1 | 4/1999 |
| EP | 1 142 689 | 10/2001 |
| JP | 54-142266 | 11/1979 |
| JP | 55-109639 | 8/1980 |
| JP | 63-317444 | 12/1988 |
| JP | 2922/1993 | 1/1993 |
| JP | 06-328549 | 11/1994 |

(Continued)

*Primary Examiner*—Joseph S. Del Sole
*Assistant Examiner*—Lorraine Rios
(74) *Attorney, Agent, or Firm*—Oblon, Spivak, McClelland, Maier & Neustadt, L.L.P.

(57) ABSTRACT

A molding method which includes charging a resin composition in molten state containing not less than 7 wt % to less than 30 wt % of a fibrous fiber (A) and more than 70 wt % to not exceeding 93 wt % of a resin (B) into a die for shaping purpose when a temperature of the die is in the range of [the Vicat softening point minus 20° C.] of resin (B) to less than a melting point thereof, when resin (B) is crystalline resin, or when a temperature of the die is in the range of [the Vicat softening point minus 20° C.] to [the Vicat softening point plus 20° C.] of the resin (B), when resin (B) is non-crystalline resin, cooling the die after shaping to temperature which allows taking-out of a molded product.

9 Claims, 2 Drawing Sheets

FOREIGN PATENT DOCUMENTS

| | | |
|---|---|---|
| JP | 07-186175 | 7/1995 |
| JP | 2547266 | 8/1996 |
| JP | 09-328586 | 12/1997 |
| JP | 10-025394 | 1/1998 |
| JP | 10-060241 | 3/1998 |
| JP | 10-100156 | 4/1998 |
| JP | 11-99546 | 4/1999 |
| JP | 2000-289074 | 10/2000 |
| JP | 2001-88200 | 4/2001 |
| JP | 2002-103406 | 4/2002 |

MOLDING METHOD AND RESIN MOLDINGS

TECHNICAL FIELD

This invention relates to a resin molding to which a fibrous filler is added and a method of molding thereof. Particularly the resin molding is used frequently in the fields of automobiles and housing facilities where rigidity and appearance are required. For example, in the automobile industry, the resin molding is used in instrumental panel parts, door parts, body panel, floor lid, side steps and the like. In the housing facility industry, the resin molding is used in prefabricated bath parts, assembled furniture, doors, roads, railroad sound-proof walls and the like.

BACKGROUND ART

Fiber reinforced resin molding is used extensively in a variety of fields including automobiles, housing facilities, and medical appliances as well as electric appliances due to its light-weight and high-rigidity features.

As for this fiber-reinforced resin molding, GFRP (Glass Fiber Reinforced Plastics) produced by molding using glass fiber as the reinforcing fiber and polypropylene, which is a type of thermoplastic resin, as the resin, and the like are well known.

The fiber-reinforced resin molding of this sort is used in the current automobile industry for main components of modules such as front-end module, door module and the like, torque converter bracket and intake system parts.

For example, as a method for manufacturing these fibrous resin moldings, injection molding and hollow molding are known which are used for manufacturing of these moldings by molding propylene homopolymer, low-density polyethylene and polypropylene composition containing glass fiber as the reinforcing fiber and talc (see for example Japanese Patent Application Laid-open No. Hei 9-328586).

The composition is molded at a die temperature higher than 100° C. to produce a resin molding with high-rigidity and uniform wall thickness.

However, when a fiber-reinforced resin molding is manufactured by the conventional molding method, lifting of the reinforcing fiber or protrusion of weld area may easily appear on the molding surface. This is not desirable from appearance viewpoints and poses a problem of lack of good design features.

Conventionally a few attempts have been made for solving the problem, such as film pasting on the surface of the resin molding or multiplayer containing no fibrous layer. However, these methods are not effective from industrial viewpoints. Although an alternative to reduce amount of the reinforcing fiber to be added is proposed, with this method, improvement of physical properties of the fiber-reinforced resin molding is not possible.

Due to the reasons as described above, conventional fiber-reinforced resin moldings were used mostly at such portion where appearance quality was not considered to raise a significant problem.

DISCLOSURE OF THE INVENTION

One object of the present invention in these problem areas is to provide a resin molding with favorable appearance without exposure of fibrous filler, and a molding method thereof.

The applicant investigated substantially methods for molding resin composition to which fibrous filler is added and found that overall appearance was improved by controlling molding conditions as well as exposure of the fibrous filler and warpage deformation were eliminated. This invention has been completed based of these findings.

The method for molding a resin molding according to this invention relates to injection molding method for manufacturing a resin molding by charging a resin composition including fibrous filler (A) and resin (B) into a die by injection, wherein the resin composition contains not less than 7 wt % to less than 30 wt % of the fibrous filler (A) and more than 70 wt % to not exceeding 93 wt % of the resin (B), and that comprises the steps of;

(a) charging the resin composition in molten state into the die for shaping purpose when a temperature of the die is in the range of [the Vicat softening point minus 20° C.] of the resin (B) to lower than a melting point thereof, when the resin (B) is crystalline resin, or charging the resin composition in molten state into the die for shaping purpose when a temperature of the die is in the range of [the Vicat softening point minus 20° C.] to [the Vicat softening point plus 20° C.] of the resin (B), when the resin (B) is non-crystalline resin; and (b) cooling down the die to a temperature which allows taking-out of a molded product, after shaping is performed (injection molding).

As for the fibrous filler (A), such as glass fiber, carbon fiber, magnesium sulfate fiber, potassium titanate fiber, titanium oxide fiber, magnesium oxy-sulfate fiber or organic filler, organic synthesis or natural fibers and the like can be used. Fiber diameter of the fibrous filler (A) should preferably be less than 25 μm.

As for the resin (B), it is preferable to use thermoplastic resin, and either crystalline resin or non-crystalline resin may be used. For example, as for the crystalline resin, polyolefin resin, polyester resin syndiotactic polystyrene and the like can be used. As for non-crystalline resin, there is no limitations and for example, polyvinylchloride, polycarbonate, acrylic resin, polystyrene and the like can be used.

According to the present invention, when the resin (B) is crystalline resin, the resin composition in molten state is charged into the die by injection for shaping purpose when the temperature of the die is in the range of [the Vicat softening point minus 20° C.] of the resin B to less than the melting point thereof, when the resin (B) is crystalline resin. When the resin (B) is non-crystalline resin, the resin composition in molten state is charged into the die by injection for shaping purpose when the temperature of the die is in the range of [the Vicat softening point minus 20° C.] to [the Vicat softening point plus 20° C.] of the resin B. This operation allows improved fluidity of the resin composition at a contact of the die and the resin composition, suppresses lifting of the fibrous filler and at the same time, a mold surface of the die is well transcribed onto the resin composition.

If shaping is attempted by charging the resin composition in molten state into the die for shaping purpose when temperature of the die is less than [the Vicat softening point minus 20° C.] of the resin (B), suppression of lifting of the fibrous filler is not possible due to reduction in fluidity of the resin composition. In other words, for obtaining a resin molding having an emboss, accurate transcription of a molded surface of the die on the resin composition is not possible and an emboss is not formed as designed. In addition, for obtaining a resin molding having mirror surface, high-gloss feature and anti-scratching feature are deteriorated and surface roughness is worsened resulting in an undesirable appearance. While if the die temperature is set to higher than melting point of the resin (B) or [the Vicat softening point plus 20° C.], molding cycle becomes longer and this is not advantageous from industrial viewpoints if production efficiency and energy efficiency are taken into considerations.

Further, by keeping the resin composition in the range of not less than 7 wt % to less than 30 wt % of the fibrous filler (A) and more than 70 wt % to not exceeding 93 wt % of the resin (B), whole appearance of the resin molding can be improved while prescribed strength is maintained.

When the fibrous filler (A) is less than 7 wt %, improvements of physical properties of the resin molding are not possible. When the fibrous filler (A) is not less than 30 wt %, it is difficult to prevent lifting of the fibrous filler (A).

According to the present invention, it is possible to manufacture a resin molding while suppressing lifting of the fibrous filler (A) and maintaining the desired strength. When embossing is provided to molded surface of the die, by suppressing lifting of the fibrous filler (A), it is possible to obtain a resin molding to which an emboss with nearly same emboss depth provided on the mold surface is formed. When mold surface of the die is mirror processed, it is possible to obtain a resin molding with fine surface roughness and good surface gloss.

Alternatively, the method for molding a resin molding according to the present invention may be such that a resin composition containing fibrous filler (A) and resin (B) is extruded to be converted into a molten parison, the parison is held in a die and, gas is blown into the parison inside, wherein the resin composition contains not less than 7 wt % to less than 30 wt % of the fibrous filler (A) and more than 70 wt % to not exceeding 93 wt % of the resin (B), gas is blown into the parison inside when temperature of the die is in the range of [the Vicat softening point minus 20° C.] of the resin B to less than the melting point thereof and shaping is performed when the resin (B) is crystalline resin, or gas is blown into the parison inside when temperature of the die is in the range of [the Vicat softening point minus 20° C.] to [the Vicat softening point plus 20° C.] and shaping is performed when the resin (B) is non-crystalline resin, and after the shaping is performed, the die is cooled down to a temperature which allows taking-out of a molded product (hollow molding method).

The fibrous filler (A) and the resin (B) used here are those mentioned previously.

According to the present invention, even with the hollow molding method having lower pressing pressure to the mold surface of the die compared to the molding method (injection molding) of the present invention mentioned previously, it is possible, by controlling the die temperature, to improve die transcription rate through improvement of fluidity of the resin composition, to suppress lifting of the fibrous filler and to improve appearance of the whole resin molding.

In the molding method of the present invention, when the resin (B) is crystalline resin, it is preferable that after shaping of the resin composition is performed, temperature of the die is held for the preset period in the range of [crystallization temperature minus 15° C.] to [crystallization temperature plus 10° C.] of the mold (B).

When a crystalline resin is used as the resin (B), warpage may be caused easily to the molded product depending on array direction of reinforcing fibers. For this reason, careful attention is required for product design, die design and molding processing conditions in manufacturing a resin molding.

According to the condition, when the resin (B) is crystalline resin, after temperature for the die is held for the preset period in the range of [crystallization temperature minus 15° C.] to [crystallization temperature plus 10° C.], and the die is cooled down to a temperature which allows taking-out of a molded product. This operation allows overall control of crystallization of the whole resin molding, suppressing lifting of fibrous filler, eliminating warpage deformation thereby, and improving appearance of the whole resin molding and dimensional accuracy.

When temperature of the die is held at lower than [crystallization temperature minus 15° C.] of the resin (B) for the preset time, crystallization rate of the resin becomes faster, and suppression of shrinkage and of warpage deformation is difficult. When temperature of the die is held at higher than [crystallization temperature plus 10° C.] of the resin (B) for the preset time, molding cycle becomes longer so that crystallization rate may be slowed, and this is not advantageous from industrial viewpoints in production efficiency and energy efficiency.

Further, by controlling cooling process of crystalline resin and other non-crystalline resin under different conditions, it is possible to select an appropriate molding cycle depending on the types of the resin and to improve the productivity.

In the molding method of the present invention, it is preferable that shaping of the resin composition is performed when temperature of the die is in the range of [the Vicat softening temperature minus 10° C.] to [melting point minus 10° C.] of the resin (B), if resin (B) is crystalline resin, and when temperature of the die is in the range of [the Vicat softening temperature minus 10° C.] to [the Vicat softening temperature plus 10° C.] of the resin (B), if the resin (B) is non-crystalline resin.

When the resin (B) is crystalline resin, if temperature of the die is higher than the melting point of the resin (B), molding cycle becomes longer and the productivity is deteriorated.

According to this condition, when the resin (B) is crystalline resin, by performing shaping of the resin composition when temperature of the die is in the range of [the Vicat softening temperature minus 10° C.] to [melting point minus 10° C.] of the resin (B), it is possible to transcribe a mold surface of the die well onto the resin composition without deteriorating the productivity. When the resin (B) is non-crystalline resin, by performing shaping of the resin composition when temperature of the die is in the range of [the Vicat softening temperature minus 10° C.] to [the Vicat softening temperature plus 10° C.] of the resin (B), it is possible to transcribe a mold surface of the die well onto the resin molding similarly without deteriorating the productivity.

In the molding method of the present invention, it is preferable that after shaping of the resin composition is performed, temperature of the die is held for the preset time in the range of [crystallization temperature minus 10° C.] to [crystallization temperature] of the resin (B), for such a case where the resin (B) is crystalline resin.

According to this condition, when the resin (B) is crystalline resin, by holding temperature of the die in the range of [crystallization temperature minus 10° C.] to [crystallization temperature] of the resin (B), it is possible to improve the productivity with an appropriate molding cycle and to suppress lifting of the fibrous filler (A) and at the same time, warpage deformation of the resin is eliminated thereby improving appearance of the whole resin molding and dimensional accuracy.

In the molding method of the present invention, it is preferable that the resin composition contains not less than 10 wt % to not exceeding to 25 wt % of the fibrous filler (A).

According to this condition, by keeping the fibrous filler (A) content in the resin composition in the range of not less than 10 wt % to not exceeding to 25 wt %, physical properties of the resin molding can be improved appropriately and lifting of the fibrous filler (A) can be suppressed.

A resin molding according to the present invention is manufactured by the molding method of the present invention as mentioned previously.

According to the present invention, similar operational effects as attained by the molding method mentioned previously can be obtained, and it is possible to suppress lifting of the fibrous filler (A) while maintaining the desired strength. A resin molding thus obtained can be used in automobile and housing facility industries and the like where rigidity and appearance are required.

Alternatively, a resin molding according to the present invention may include a resin composition containing not less than 7 wt % to less than 30 wt % of the fibrous filler (A) and more than 70 wt % to not exceeding 93 wt % of the resin (B), wherein surface roughness is less than 5 μm, and an image representation of 1 mm square rectangular frame being reflected-on the surface can be discriminated.

When surface roughness of a resin molding to which the fibrous filler (A) is added is more than 5 μm, the fibrous filler (A) may appear easily on the surface of the resin molding. Besides, even if the fibrous filler (A) is not exposed to the surface of the resin molding, unevenness may be easily formed on the surface by the fibrous filler (A).

When an image representation of 1 mm square rectangular frame being reflected on the surface can not be discriminated (image clarity is not satisfactory), it indicates in many cases that either surface of the resin molding is rough or anti-scratching feature and high-gloss feature of the resin molding are not satisfactory.

According to the present invention, surface roughness is less than 5 μm and an image representation of 1 mm square rectangular frame being reflected on the surface is formed so as to be discriminated, it is possible to present a resin molding with good appearance by suppressing lifting of the resin filler (A).

Alternatively, a resin molding according to the present invention may contain a resin composition containing not less than 7 wt % to less than 30 wt % of the fibrous filler (A) and more than 70 wt % to not exceeding 93 wt % of the resin (B), and if it has an emboss on the surface, and it satisfies either of the following two cases: (1) In the case of emboss being provided on the whole surface of the molding, rate of die transcription is more than 90%, (2) In the case of emboss being provided in part on the molding, rate of die transcription is more than 90% and surface roughness of such an area where there is no emboss is less than 5 μm.

The rate of die transcription can be expressed by a ratio (h/H) where H means depth of emboss of the die and h means depth of emboss of the resin molding formed by this die. When this rate of die transcription is less than 90%, lifting of the fibrous filler (A) is caused and transcription of the emboss is not made satisfactorily resulting in poor appearance.

For resin molding having emboss in part on the resin molding, when surface roughness at a non-emboss area where there is more than 5 μm, lifting of the fibrous filler (A) becomes easily remarkable resulting in poor appearance and lack of image clarity.

According to the present invention, the resin molding satisfying either (1) or (2) mentioned above, may suppress lifting of the fibrous filler (A) and present good appearance.

As for the resin molding according to the present invention, it is preferable that the resin composition contains not less than 10 wt % to not exceeding to 25 wt % of the fibrous filler (A).

According to this composition, by the fact that a resin composition contains not less than 10 wt % to not exceeding to 25 wt % of the fibrous filler (A), a resin composition is able to suppress lifting of the fibrous filler (A) and to present a resin molding with good appearance.

BEST MODE FOR CARRYING OUT THE INVENTION

Figure 1:
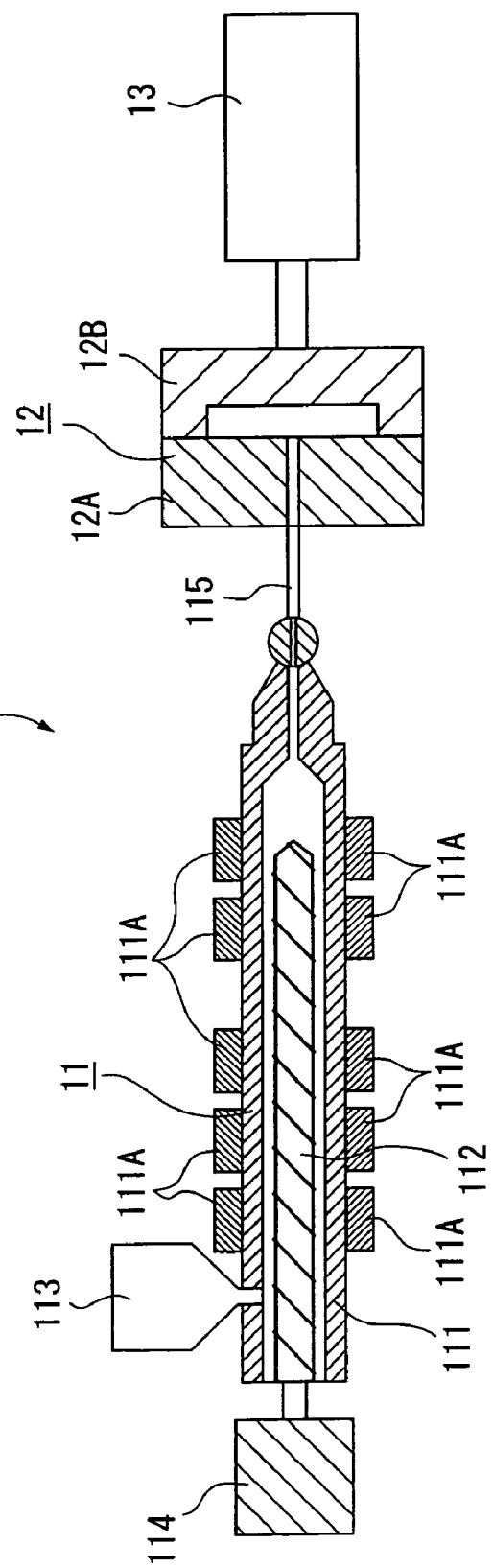
FIG. 1 is a sectional view showing an injection molding machine used in the molding method relating to the first embodiment of the present invention.

Preferred embodiments of the present invention are described hereafter referring to the drawings.

FIRST EMBODIMENT

FIG. 1 is a sectional view of injection molding machine 1 used in the molding method relating to the first embodiment of the present invention.

Injection molding machine 1 produces resin molding having the prescribed shape from resin compositions in which fibrous filler (A) and thermoplastic resin (B) are mixed, and has injection device 11, die 12, and clamping device 13.

The injection device 11 plasticizes resin composition being charged and injects it to the die 12, has cylinder 111 equipped with heater 111A, screw 112 which is arranged in the cylinder 111, hopper 113 through which raw materials are charged in the cylinder 111, hydraulic device 114 used for turning of the screw 112, and nozzle 115 connecting the cylinder 111 and die 12.

The resin composition being charged from the hopper 113 and heated by the heater 111A of the cylinder 111 is kneaded by the screw 112 to be plasticized, moved to the nozzle 115 and is injected into the die through nozzle 115 by high-pressure.

The die 12 has the fixed die 12A mounted to the nozzle 115 and a movable die 12B being retractable with this fixed die 12A, and the movable die 12B moves forward and backward by operation of the clamping device 13, thus the die 12 performs opening and closing operations. While the fixed die 12A and movable die 12B are being engaged, a cavity is formed inside this engagement. A temperature control function (not illustrated) for controlling temperature of the die 12 is equipped in the die 12.

There are various surface conditions of die 12 which is surface treated depending on applications of the resin molding, for example, mirror finish less than 0.5 S, embossing, pattern printing, character and graphical printing, or any combination thereof.

The clamping device 13 holds a closed state of the die 12 by a clamping force sufficiently large to resist against opening/closing operations of the die 12 and injection pressure of the injection device 11. For example, this clamping device 13 may be a direct pressure type clamping device which transmits a force directly to a molding die without changing a driving power generated by the driving device such as hydraulic cylinder and the like, or a toggle type clamping device which amplifies a force generated by the driving device such as hydraulic cylinder and the like by means of combinations of links to generate a large clamping force to the molding die.

Hereafter a method of molding of a resin composition using injection molding machine 1 shown above will be described.

First, the clamping device 13 is operated, so that the movable die 12B is then moved and clamping of the die 12 is performed Second, after clamping of the die 12 is completed, the injection device 11 is operated, and the hydraulic device 114 starts turning of the screw 112. Resin composition being charged from the hopper 113 is fed from rear end to front end of the screw due to turning of the screw 112, and kneaded and melted while being heated by the heater 111A of cylinder 111.

The resin composition thus melted moves to nozzle 115, is pressurized by the prescribed pressure at front end of the screw 112, and is injected inside the die 12 under he pressure. It is then filled into the die 12 to be shaped, and the hydraulic device 114 stops turning of the screw 112 by detecting a pressure of the molten resin composition.

It is preferable that when the thermoplastic resin (B) is crystalline resin, a temperature of the die 12 (temperature at shaping) is controlled by the temperature control mechanism and is set in the range of [the Vicat softening point Tb minus 20° C.] of the thermoplastic resin (B) to the melting point thereof. For such a case where the thermoplastic resin (B) is non-crystalline resin, it is preferable to set the temperature in the range of [the Vicat softening point Tb minus 20° C.] to [the Vicat softening point Tb plus 20° C.] of the thermoplastic resin (B). It is further preferable that for such a case where the thermoplastic resin (B) is crystalline resin, the temperature is set in the range of [the Vicat softening point Tb minus 10° C.] of the thermoplastic resin (B) to [melting point minus 10° C.], and for such a case where the thermoplastic resin (B) is non-crystalline resin, the temperature is set in the range of [the Vicat softening point Tb minus 10° C.] to [the Vicat softening point Tb plus 10° C.] of the thermoplastic resin (B).

After the resin composition is shaped in the die 12, the melted resin composition is cooled by controlling the temperature of die 12 by the temperature control mechanism.

It is preferable that for such a case where the thermoplastic resin (B) is crystalline resin, a temperature of the die 12 (temperature at holding) is held for the preset time in the range of [crystallization temperature Tc minus 15° C.] to [crystallization temperature Tc plus 10° C.] of the thermoplastic resin (B), and it is further preferable to hold the temperature for the preset time in the range of [crystallization temperature Tc minus 10° C.] to [crystallization temperature Tc] of the thermoplastic resin (B).

The preset time should be held in the range of 10 to 300 sec., preferably in the range of 30 to 200 sec. Although the longer this holing time, the better products are obtained, more than 300 sec is not desirable since molding cycle becomes longer and the productivity is deteriorated. This temperature range and holding time are determined based on the tolerance of lifting of the fibrous filler of resin molding considering size of and thickness of resin molding, type of resin, presence of additives comprehensively.

After the resin composition is held for the preset time, the temperature is controlled by the temperature control mechanism and lowered to such a level as the resin molding can be taken out (temperature at cooling), for example, down to glass transition temperature Tg of the thermoplastic resin (B). This cooling rate is in the range which is normally used for injection molding method.

When the thermoplastic resin (B) is non-crystalline resin, the temperature is cooled down to a level which allows taking-out of the resin molding without holding it for the preset time.

After the resin molding is cooled down to the temperature which allows taking-out, the clamping device 13 is operated, and moves the movable die 12B so as to be separated from the fixed die 12A, releases clamping of the die 12, and mold opening of the die 12 is performed thereby manufacturing a resin molding.

As for the fibrous filler (A), glass fiber, carbon fiber, magnesium sulfate fiber, potassium titanate fiber, titanium oxide fiber, magnesium oxy-sulfate fiber or organic filler, organic synthetic or natural fibers and the like can be used. As for type of the fibers, continuous fiber, chopped strand and the like can be used. In this case, fiber diameter of the fibrous filler (A) should preferably be less than 25 μm.

As for the thermoplastic resin (B), for example, polypropylene, polyethylene, polystyrene, polycarbonate, ABS (acrylonitrile butadiene styrene copolymer), AES (acrylonitrile ethylene propylene rubber styrene copolymer), AS (acrylonitrile styrene copolymer), modified PPE (polyphenylene ether), PPS (polyphenylene sulfide), nylon, SPS (syndiotactic polystyrene) and the like, and composite material thereof can be used.

It is preferable that the resin composition contains not less than 7 wt % to less than 30 wt % of a fibrous fiber (A) and more than 70 wt % to not exceeding 93 wt % of the thermoplastic resin (B). It is further preferable that the fibrous filler (A) is contained not less than 10 wt % to not exceeding to 25 wt %.

According to the first embodiment as mentioned above, the following results are obtained:

When a resin composition in molten state is filled into the die and shaping is performed, temperature of the die 12 (temperature at shaping) is controlled by the temperature control mechanism and is set in the range of [the Vicat softening point Tb minus 20° C.] of the thermoplastic resin (B) to less than the melting point thereof, for such a case where the thermoplastic resin (B) is crystalline resin, and is set in the range of [the Vicat softening point Tb minus 20° C.] to [the Vicat softening point Tb plus 20° C.] for such a case where the thermoplastic resin (B) is non-crystalline resin. This operation allows improved fluidity of the resin composition at a contact of the die 12 and the resin composition, suppresses lifting of the fibrous filler and at the same time, a molded surface of the die 12 is well transcribed onto the resin composition.

When the temperature is set in the range of [the Vicat softening point Tb minus 10° C.] of the thermoplastic resin (B) to [melting point minus 10° C.] for such a case where the thermoplastic resin (B) is crystalline resin, and is set in the range of [the Vicat softening point Tb minus 10° C.] to [the Vicat softening point Tb plus 10° C.] for such a case where the thermoplastic resin (B) is non-crystalline resin, molding cycle is shortened and a molded surface of the die 12 is well transcribed onto the resin composition.

Besides, after a resin composition is shaped in the die 12 and when a shaped resin composition is cooled, temperature of the die 12 (temperature at holding) is set by the temperature control mechanism in the range of [crystallization temperature Tc minus 10° C.] to [crystallization temperature Tc plus 10° C.] of the thermoplastic resin (B), and is held for the preset time for such a case where the thermoplastic resin (B) is crystalline resin. This operation allows comprehensive control of the crystallization of the whole resin molding as well as crystallization on the surface of the resin molding, suppression of lifting of the fibrous filler, elimination of warpage deformation of the resin thereby contributing to improvement of appearance of the whole resin molding and of dimensional accuracy.

When the temperature is held in the range of [crystallization temperature Tc minus 10° C.] to [crystallization temperature Tc] of the thermoplastic resin (B) for the preset time, molding cycle is shortened, and appearance of the whole resin molding and dimensional accuracy are improved.

When the shaped resin composition is cooled after being shaped in the die 12, it is cooled down to a level which allows taking-out of the resin molding without holding it for the preset time, for such a case where the thermoplastic resin (B) is non-crystalline. This consideration allows that if crystalline resin and non-crystalline resin are controlled under different cooling conditions, an appropriate molding cycle is selected depending on the type of resin thereby improving the productivity.

Further, by keeping a resin composition in the range of not less than 7 wt % to less than 30 wt % of a fibrous fiber (A) and more than 70 wt % to not exceeding 93 wt % of the thermoplastic resin (B), appearance of the whole resin molding can be improved while maintaining the prescribed strength.

In this case, if the resin composition contains more than 10 wt % to less than 25 wt % of the fibrous filler (A), physical properties of the resin molding can be improved adequately and at the same time, lifting of the fibrous filler (A) can be suppressed surely.

According to the abovementioned method, it is possible to manufacture a resin molding with the desired strength and suppressing lifting of the fibrous filler (A). When an embossing is provided on the molded surface of the die 12, by suppressing lifting of the fibrous filler (A), it is possible to obtain a resin molding to which an emboss with nearly same emboss depth provided on the molded surface is formed. When the molded surface of the die 12 is mirror finished, it is possible to obtain a resin molding with finer surface roughness and good surface gloss.

By providing a method for controlling die temperature such as temperature control mechanism to ordinary injection molding machine, it is possible to obtain a resin molding as mentioned above, and application fields of the present invention will be greatly expanded.

SECOND EMBODIMENT

In the following description, the same number as used in the above first embodiment will be used for same constructions and parts, and their detailed explanations are omitted or simplified.

In the first embodiment, manufacturing of a resin molding is made by injection molding method.

While the second embodiment differs in that hollow molding method is used for manufacturing of a resin molding.

Figure 2:
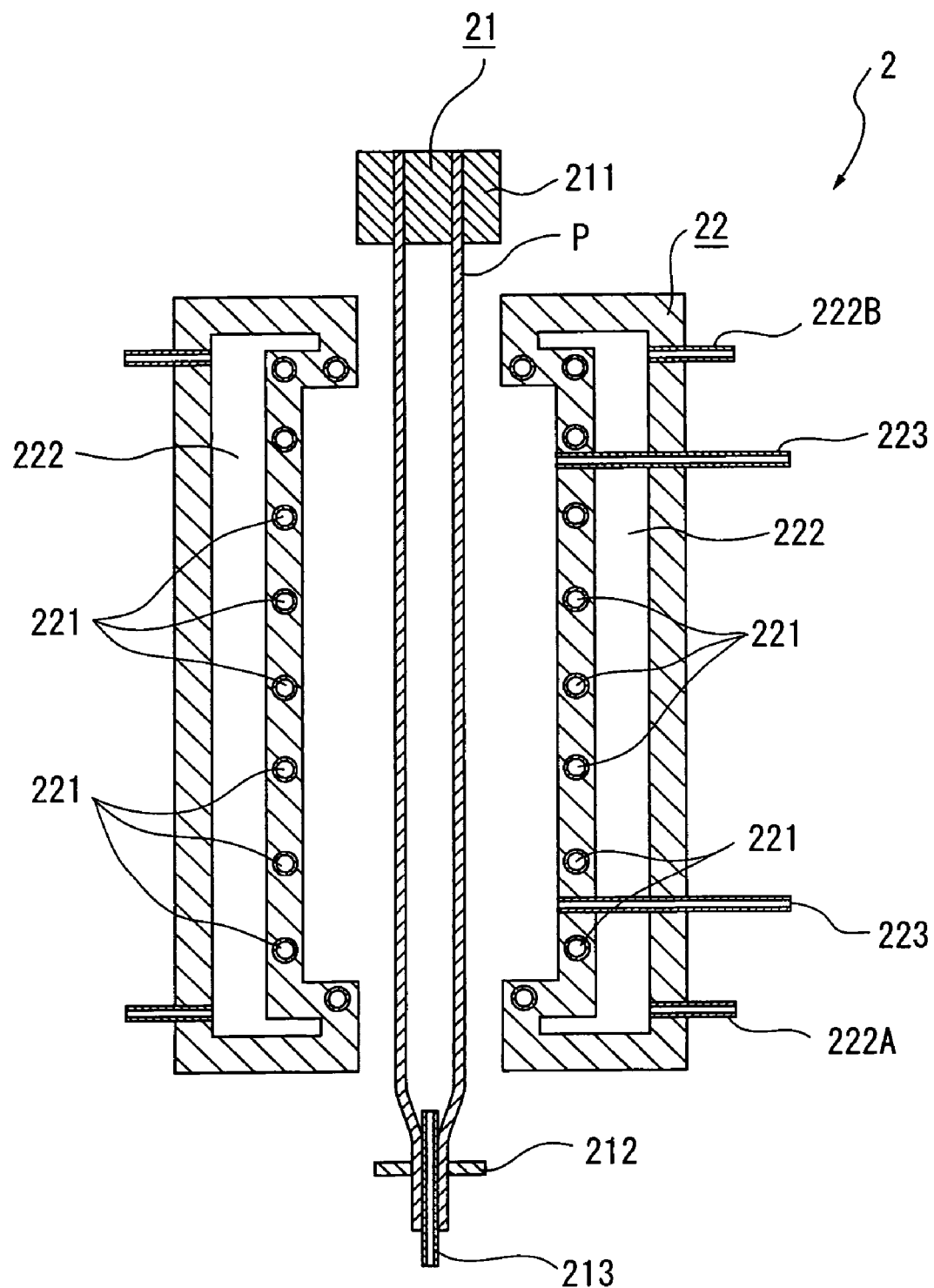
FIG. 2 is a sectional view showing a hollow molding machine used in the molding method relating to the second embodiment of the present invention.

FIG. 2 is a sectional view of a hollow molding machine used in the molding method relating to the second embodiment of the present invention.

Hollow molding machine 2 is a machine which produces resin molding having the prescribed shape from resin composition in which fibrous filler (A) and thermoplastic resin (B) are mixed, and has hollow molding machine body 21 and die 22.

Hollow molding machine body 21 performs melting and kneading of resin composition and extrudes it in the form of parison P in between die 22, and has extrusion dice 211 which converts parison P being extruded into cylindrical form, parison sealing 212 which seals lower end part of parison P, and gas injection pipe 213 which blows a gas into parison P.

The die 22 works so as to be freely opened or closed, and is used for grasping parison P being extruded by the hollow molding machine body 21, and has a die temperature control pipe 221 for regulating temperature of the die 22, a cooling jacket 222 for cooling of the die 22 and a gas blowing pipe 223 for blowing of air from the die 22 to parison P inside.

The die temperature control pipe 221 regulates temperature of the die 22 by circulating, for example, steam, heating oil and the like.

The cooling jacket 222 has a cooling medium inlet 222A being connected to the outside and a cooling medium outlet 222B, a cooling medium is introduced from the outside from the cooling medium inlet 222A and cooling medium outlet 222B for cooling of the die 22.

The gas blowing pipe 223 works so as to move forward or backward smoothly or from the inside to the outside of the die 22, protruded into the die 22 and stabbed into parison P for blowing a gas into parison P.

Hereafter a method for molding a resin composition using above-mentioned hollow molding machine 2 will be described.

First, the hollow molding machine 2 is operated, and an extruder (not illustrated) performs melting and kneading of the resin composition and extrudes it. Normally using an accumulator, parison P in cylindrical from is extruded from the extrusion dice 211 between one set of mold opened die 22. Then the parison sealing 212 seals lower end part of parison P thus extruded.

Second, air is blown from the gas injection pipe 213 to parison P inside for pre-blowing purpose and the parison P is then inflated to some extent. Clamping of the die 22 then starts and the parison P is grasped.

At the time close to completion of clamping of the die 22, the gas injection pipe 213 is protruded from die surface and is stabbed into parison wall thereby introducing air into parison inside. Parison P then inflates, presses itself against the mold surface and brings itself into intimate contact with mold surface of the die 22 to perform shaping.

It is preferable that in a similar fashion as observed in the first embodiment, temperature of the die 22 (temperature at shaping) is set by the die temperature control pipe 221 in the range of [the Vicat softening point Tb minus 20° C.] of the thermoplastic resin (B) to less than the melting point thereof, for such a case where the thermoplastic resin (B) is crystalline resin, and in the range of [the Vicat softening point Tb minus 20° C.] to [the Vicat softening point Tb plus 20° C.] of the thermoplastic resin (B), when the thermoplastic resin (B) is non-crystalline resin. It is further preferable that the temperature is set in the range of [the Vicat softening point Tb minus 10° C.] to [melting point minus 10° C.] of the thermoplastic resin (B) when the thermoplastic resin (B) is crystalline resin, and in the range of [the Vicat softening point Tb minus 10° C.] to [the Vicat softening point plus 10° C.] of the thermoplastic resin (B) for such a case where the thermoplastic resin (B) is non-crystalline resin.

After a resin composition is shaped in the die 22, melted resin composition in the die 22 is cooled by the cooling jacket 222.

It is preferable that in a similar way as observed in the first embodiment, temperature of the die 22 (temperature at holding) is held for the preset time in the range of [crystallization temperature Tc minus 15° C.] to [crystallization temperature Tc plus 10° C.] of the thermoplastic resin (B) when the thermoplastic resin (B) is crystalline resin, and it is further preferable that the temperature is held for the preset time in the range of [crystallization temperature Tc minus 10° C.] to [crystallization temperature Tc].

The preset time should be held in the range of 10 to 300 sec., preferably in the range of 30 to 200 sec. Although the longer this holing time, the better products are obtained, longer than 300 sec is not desirable since molding cycle becomes longer and the productivity is deteriorated. This temperature range and the holding time are determined based on the tolerance of lifting of the fibrous filler of resin molding considering size of and thickness of resin molding, and type of resin, presence of additives and the like comprehensively.

When the die 22 is held at the prescribed temperature, a cooling medium is circulated through the cooling jacket 222 while the heated medium is being maintained in the die temperature control pipe 221.

After keeping the prescribed temperature for the preset time, the medium heated to the prescribed temperature in the die temperature control pipe 221 and cooling jacket 222 is extracted, cooling medium at approximately room temperature is introduced in the cooling jacket 222 in order to cool the temperature to such a level where the resin molding can be taken out (temperature at cooling), for example, down to glass transition temperature Tg of the thermoplastic resin (B). This cooling rate is in the range which is normally used for hollow molding method.

The temperature is cooled down to a level which allows taking-out of the resin molding without holding it for the preset time, for such a case where the thermoplastic resin (B) is non-crystalline.

Resin molding is thus manufactured by the hollow molding method according to processes mentioned above.

As for the resin composition (fibrous filler (A) and thermoplastic resin (B)), materials similar to those used in the first embodiment can be adopted.

According to the second embodiment as mentioned above, the following results are obtained:

Even with the hollow molding method using lower pressing pressure to the molded surface of the die 22 compared to the molding method mentioned in the first embodiment, it is possible, by controlling the temperature of die 22, to improve die transcription rate through improvement of fluidity of the resin composition, to suppress lifting of the fibrous filler (A) and to improve appearance of the whole resin molding. For such a case where the thermoplastic resin (B) is crystalline resin, crystallization of whole resin molding as well as crystallization on the surface of the resin molding can be controlled which eliminates warpage deformation and improves dimensional accuracy.

By providing a method for controlling die temperature such as die temperature control pipe and cooling jacket and the like, it is possible to obtain a resin molding as mentioned above, and application fields of the present invention will be greatly expanded.

EMBODIMENTS

Features and advantages of the present invention will be described hereafter with reference to detailed examples.

Embodiment 1

In the embodiment 1, molding is made by hollow molding method according to the second embodiment under molding conditions shown hereafter, and a resin molding with 3 mm thickness at general part was manufactured.

(Molding Conditions)

Hollow molding machine: Model IPB-EPML-90S manufactured by Ishikawajima-Harima Heavy Industries, Co., Ltd. [Die: 200 mmφ], Accumulator capacity: 13.5 liter, Die clamping pressure: 60 ton, Screw diameter: 90 mm]

Die: Flat plate [Length: 600 mm, Width: 400 mm, Thickness: 25 mm, Molded surface: Mirror finish less than 0.5 S]

Die temperature; Temperature at shaping: 135° C.

Temperature at holding: 125° C.

Temperature at cooling: 60° C.

At shaping, heating is performed by circulating steam in the die temperature control pipe 221. At temperature holding, water is introduced into the cooling jacket 222 while steam is being circulated in the die temperature control pipe 221. At cooling, steam in the die temperature control pipe 221 is drained and water is passed through the cooling jacket 222.

Time for blowing: 150 sec.

Resin composition; Fibrous filler (A): GF chopped strand [Fiber diameter: 10 μm, Fiber length: 0.5 mm]

Thermoplastic resin (B): B-PP: Propylene block copolymer [Manufactured by Idemitsu Kosan Co., Ltd., IDEMITSU PP, E-185G, MI: 0.3 g/10 min. (230° C., 2.16 kg load), Vicat softening point: 145° C., Crystallization temperature: 125° C., Melting point: 160° C.]

Amount of fibrous filler (A) added: 30 wt % (with regard to resin composition 100 wt %)

A resin composition in which the fibrous filler (A) and thermoplastic resin (B) were dry blended was molded by the hollow molding method according to the second embodiment.

Embodiment 2

In the embodiment 2, a resin molding was manufactured by the same method as used in the embodiment 1 except that the molding conditions (resin composition) in the embodiment 1 were altered as follows:

Resin composition; Fibrous filler (A): Glass fiber [Fiber diameter: 16 μm, Fiber length: 4 mm]

Thermoplastic resin (B): Homopolypropylene [Vicat softening point: 145° C., Crystallization temperature: 125° C., Melting point: 160° C.]

Amount of fibrous filler (A) added: 20 wt % (with regard to resin composition 100 wt %)

A resin composition in pellet form, in which glass fibers of the fibrous filler (A) are arranged nearly in parallel in longitudinal direction and the thermoplastic resin (B) is impregnated in the glass fibers, was molded by the hollow molding method according to the second embodiment.

Embodiment 3

In the embodiment 3, a resin molding was manufactured by the same method as used in the embodiment 2 except that the molding conditions in the embodiment 2 were altered as follows:

Die; Molded surface: Embossing used for automobile interior decoration

Embodiment 4

In the embodiment 4, molding of a resin molding was performed by the injection molding method according to the first embodiment under molding conditions shown hereafter. Resin composition and die temperature same as those used in the embodiment 2 were applied.

(Molding Conditions)
Injection molding machine: clamping pressure of 850 ton
Die; Flat plate [Length: 600 mm, Width: 400 mm, Thickness: 25 mm, Molded surface: Mirror finish less than 0.5S]

Embodiment 5

In the embodiment 5, a resin molding was manufactured by the same method as used in the embodiment 2 except that the molding conditions in the embodiment 2 were altered as follows:
Die temperature: Temperature at holding: 115° C.

Embodiment 6

In the embodiment 6, a resin molding was manufactured by the same method as used in the embodiment 2 except that the molding conditions in the embodiment 2 were altered as follows:
Die temperature: Temperature at holding: 135° C.

Embodiment 7

In the embodiment 7, a resin molding was manufactured by the same method as used in the embodiment 1 except that the molding conditions in the embodiment 1 were altered as follows:
Resin composition; Thermoplastic resin (B): Shock resistance polystyrene (HIPS, manufactured by Idemitsu Kosan Co., Ltd., HT52). Namely, amorphous thermoplastic resin that is different from those used in the embodiments 1 through 6 was used.
Die temperature; Temperature at shaping: 130° C.
Temperature at cooling: 60° C.
In the embodiment 7, shaping of a resin composition was performed in the die heated to 130° C. and after the preset time, cooling was performed at 60° C. Namely, different from embodiments 1 through 6, a process of holding at the prescribed temperature after shaping of resin composition was not performed.

Embodiment 8

In the embodiment 8, molding of a resin molding was performed by the same method as used in the embodiment 2 except that the molding conditions in the embodiment 2 were altered as follows:
Die temperature; Temperature at holding: 100° C.
In the embodiment 8, shaping of a resin composition was performed in the die heated to 130° C. and after shaping, it was held in the die heated to 100° C. Cooling was started after holding for the preset time. In other words, the embodiment 8 was adapted to the temperature range of ([the Vicat softening point minus 20° C.] to less than melting point) at shaping according to Claim 1 of the present invention. The embodiment 8 is the one in which holding temperature was varied from those in the embodiments 2, 5, and 6, to compare with these embodiments. The temperature at holding in the embodiment 8 does not fall into the temperature range ([crystallization temperature minus 15° C.] to [crystallization temperature plus 10° C.]) according to claim 3 of the present invention.

COMPARISON EXAMPLE 1

In the comparison example 1, a resin molding was manufactured by the same method as used in the embodiment 2 except that the molding conditions in the embodiment 2 were altered as follows:
Die temperature; 80° C. (constant)
In the comparison example 1, shaping of a resin composition was performed in the die heated to 80° C. and cooling was started after the preset time. Namely, different from embodiments 1 through 6, a process of holding at the prescribed temperature after shaping of crystalline resin composition was not performed.

COMPARISON EXAMPLE 2

In the comparison example 2, a resin molding was manufactured by the same method as used in the comparison example 1 except that the molding conditions in the comparison example 1 were altered as follows:
Die; molded surface: Embossing used for automobile interior decoration

COMPARISON EXAMPLE 3

In the comparison example 3, a resin molding was manufactured by the same method as used in the comparison example 1 except that the molding conditions in the comparison example 1 were altered as follows:
Die temperature; 160° C. (constant)
In the comparison example 3, shaping of a resin composition was performed in the die heated to 160° C. and cooling was started after the preset time. Namely, different from embodiments 1 through 6, the temperature at shaping did not fall into the prescription (outside [the Vicat softening point minus 25° C.] to less than melting point or [the Vicat softening point plus 25° C.]), and a process of holding at the prescribed temperature after shaping of crystalline resin composition was not performed.

COMPARISON EXAMPLE 4

In the comparison example 4, a resin molding was manufactured by the same method as used in the embodiment 4 except that the molding conditions in the embodiment 4 were altered as follows:
Die temperature; 40° C. (constant)
In the comparison example 4, shaping of a resin composition was performed in the die heated to 40° C. and cooling was started after the preset time. Namely, different from embodiments 1 through 6, the temperature at shaping did not fall into the prescription (outside [the Vicat softening point minus 25° C.] to less than melting point or [the Vicat softening point plus 25° C.]), and a process of holding at the prescribed temperature after shaping of crystalline resin composition was not performed.

COMPARISON EXAMPLE 5

In the comparison example 5, molding of a resin molding was performed by the same method as used in the embodiment 7 except that the molding conditions in the embodiment 7 were altered as follows:
Die temperature; Temperature at shaping: 80° C.
For resin moldings molded in the embodiments 1 through 8 and comparison examples 1 through 5, assessment was made according to the following evaluation method:
(Evaluation Method)
1. Average Surface Roughness
Fine unevenness on the resin molding surface generated by mirror finished die is measured using a scanning type laser microscope (Olympus Optical Co., Ltd. make LSM-GM).

In other words, this sort of measurement is performed for resin moldings molded by embodiments 1, 2, and 4 through 8, and by comparison examples 1, and 3 through 5.

2. Image Clarity

A sheet of section paper with 1 mm square is held over the resin molding surface obtained by mirror finished die, and judgment is made whether or not square cells can be clearly visually discriminated from the image reflected on the resin molding.

Namely, in similar manner of evaluation of the average surface roughness, this sort of measurement is performed for resin moldings molded by embodiments 1, 2, and 4 through 8, and by comparison examples 1, and 3 through 5.

3. Die Transcription Rate for Molded Products

Emboss height on the resin molding surface obtained by a die subjected to embossing is measured using a scanning type laser microscope (Olympus Optical Co., Ltd. make LSM-GM). At the same time, emboss depth on the die surface subjected to embossing is measured. Then a ratio expressed by emboss height on the resin molding surface divided by emboss depth on the die surface is calculated.

Namely, this sort of measurement is performed for resin moldings molded by embodiment 3 and comparison example 2.

4. Shrinkage and Warpage

Presence of shrinkage on the resin molding surface is evaluated visually. Besides, a resin molding is placed on the flat plane and status of warpage deformation is evaluated visually.

Results of evaluation should be made as follows;

○: Good

Δ: Shrinkage or warpage is observed slightly.

x: Shrinkage or warpage is observed apparently.

Tables 1 and 2 show molding conditions and results of evaluation of embodiments 1 through 8, comparison examples 1 through 5.

TABLE 1

| | | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|---|
| Materials used | | Short fiber G F | Continuous fiber G F | ← | ← | ← | ← | Short fiber G F | Continuous fiber G F |
| | | Crystalline resin | Crystalline resin | ← | ← | ← | ← | Non-crystalline resin | Crystalline resin |
| Fiber length(mm) | | 0.5 | 4 | ← | ← | ← | ← | 0.5 | 4 |
| Amount of fiber added (wt %) | | 30 | 20 | ← | ← | ← | ← | 30 | 20 |
| Molding method | | Hollow molding | ← | ← | Injection molding | Hollow molding | ← | ← | ← |
| Die temperature | At shaping | 135 | ← | ← | ← | ← | ← | 130 | ← |
| | At holding | 125 | ← | ← | ← | 115 | 135 | — | ← |
| | At cooling | 60 | ← | ← | ← | ← | ← | ← | ← |
| Die surface | | Mirror finishing | ← | Embossing | Mirror finishing | ← | ← | ← | 100 |
| Average surface roughness (μm) | | 2 | 3 | — | 2 | 4 | 2 | 2 | 10 |
| Image clarity | | Good | Good | — | Good | Good | Good | Good | Poor |
| Die transcription rate | | — | — | 95 | — | — | — | — | — |
| Shrinkage and warpage | | ○ | ○ | ○ | ○ | ○ | ○ | ○ | ○ |

TABLE 2

| | | Comparison example 1 | Comparison example 2 | Comparison example 3 | Comparison example 4 | Comparison example 5 |
|---|---|---|---|---|---|---|
| Materials used | | Short fiber G F | ← | ← | ← | Short fiber G F |
| | | Crystalline resin | ← | ← | ← | Non-crystalline resin |
| Fiber length(mm) | | 4 | ← | ← | ← | 0.5 |
| Amount of fiber added (wt %) | | 20 | ← | ← | ← | 30 |
| Molding method | | Hollow molding | ← | ← | Injection molding | Hollow molding |
| Die temperature | At shaping | 80 | ← | 160 | 40 | 80 |
| | At holding | — | — | — | — | — |
| | At cooling | — | — | — | — | 60 |
| Die surface | | Mirror finishing | Embossing | Mirror finishing | ← | ← |
| Average surface roughness (μm) | | 40 | — | Evaluation impossible due to excessive deformation of resin molding | 2 | 2 |
| Image clarity | | Poor | — | | Good | Good |
| Die transcription rate | | — | 50 | | — | — |
| Shrinkage and warpage | | Δ | Δ | x | ○ | ○ |

Evaluation of embodiment 1 shows that average surface roughness is 2 μm, image clarity is good, and evaluation of shrinkage and warpage is good (○).

In the case average surface roughness of the fiber-reinforced resin molding is more than 5 μm, fibrous filler (A) is easily exposed on the surface of resin molding. Even if exposure on the surface of resin molding is not recognized, unevenness is easily formed on the surface by the resin filler (A). It is considered that in the case of the embodiment 1, lifting of the fibrous filler (A) is suppressed due to that average surface roughness is 2 μm.

In the case image clarity is poor, the following factors may be responsible in many cases:

For example, surface of the resin molding is rough, anti-scratching feature and high-gloss feature of the resin molding are not satisfactory, or surface of the resin molding is distorted.

In the case of the embodiment 1, from the fact image clarity of this resin molding is good, it is considered that surface gloss is good, surface of the resin molding is free from distortion, and anti-scratching feature is satisfactory.

Besides, due to that evaluation of shrinkage and warpage of this resin molding is good, it can be confirmed that the resin molding has good appearance and high dimensional accuracy.

Therefore, in the embodiment 1, even when 30 wt % fibrous filler (A) is added, a resin molding with good appearance, less warpage deformation, and excellent dimensional stability could be molded with suppressing lifting of the fibrous filler (A).

In the case of the embodiment 2, results obtained are average surface roughness of 3 μm, good image clarity, and good evaluation (○) for shrinkage and warpage.

Therefore, as is the case of the embodiments 1, a resin molding with good appearance, less warpage deformation, and excellent dimensional stability could be molded with suppressing lifting of the fibrous filler (A).

In the case of the embodiment 3, results obtained are die transcription rate of 95% and good evaluation (○) for shrinkage and warpage.

In the case die transcription rate is less than 90%, average surface roughness of the resin molding exceeds 5 μm in many cases. Namely, the fibrous filler (A) is exposed at surface of the resin molding in many cases. In the case of the embodiment 3, from the fact die transcription rate is 95%, lifting of the fibrous filler (A) is suppressed and the emboss is transcribed surely resulting in good appearance.

Besides, due to that evaluation of shrinkage and warpage is good, it can be confirmed that the resin molding has good appearance and high dimensional accuracy.

Therefore, in the case of the embodiment 3, as is the cases of the embodiments 1 and 2, a resin molding with good appearance, less warpage deformation, and excellent dimensional stability could be molded while suppressing lifting of the fibrous filler (A).

In the case of the embodiment 4, as is the case of the embodiment 1, results obtained are average surface roughness of 2 μm, good image clarity, and good evaluation (○) for shrinkage and warpage.

Therefore, in the embodiment 4, as is the cases of the embodiments 1 and 3, a resin molding with good appearance, less warpage deformation, and excellent dimensional stability could be molded with suppressing lifting of the fibrous filler (A).

In the case of the embodiment 5, results obtained are average surface roughness of 4 μm, good image clarity and good evaluation (○) for shrinkage and warpage.

Therefore, in the embodiment 5, as is the cases of the embodiments 1 and 4, a resin molding with good appearance, less warpage deformation, and excellent dimensional stability could be molded while suppressing lifting of the fibrous filler (A).

In the case of the embodiment 6, as is the cases of the embodiments 1 and 4, results obtained are average surface roughness of 2 μm, good image clarity and good evaluation (○) for shrinkage and warpage.

Therefore, in the embodiment 6, as is the cases of the embodiments 1 and 5, a resin molding with good appearance, less warpage deformation, and excellent dimensional stability could be molded with suppressing lifting of the fibrous filler (A).

In the case of the embodiment 7, as is the cases of the embodiments 1, 4 or 6, results obtained are average surface roughness of 2 μm, good image clarity and good evaluation (○) for shrinkage and warpage.

Therefore, in the embodiment 6, as is the cases of the embodiments 1 and 5, a resin molding with good appearance, less warpage deformation, and excellent dimensional stability could be molded while suppressing lifting of the fibrous filler (A).

In the case of the embodiment 8, results obtained are average surface roughness of 10 μm, poor image clarity and good evaluation (○) for shrinkage and warpage.

In the case of the embodiment 8, since the temperature at holding is outside the prescription, average surface roughness is more than 5 μm. However, the temperature at shaping is within the prescription and therefore, comparatively lower average surface roughness (10 μm) compared to the comparison example 4 is attained. If compared to the embodiment 1 or 6, it is understood that the temperature at holding should preferably be in the range of [crystallization temperature minus 15° C.] to [crystallization temperature plus 10° C.].

In the case of the comparison example 1, results are average surface roughness of 40 μm, poor image clarity and evaluation of shrinkage and warpage is Δ.

Therefore, from average surface roughness and result of image clarity, it is considered that suppression of lifting of the fibrous filler (A) was not possible and a resin molding with good appearance could not be obtained.

In the case of the comparison example 2, results obtained are die transcription rate of 50% and evaluation of shrinkage and warpage is Δ.

Therefore, from the result of die transcription rate, it is considered that suppression of lifting of the fibrous filler (A) was not possible and a resin molding with good appearance could not be obtained.

In the case of the comparison example 3, evaluation was not possible due to excessive deformations of the resin molding.

Therefore, if the die temperature during molding was not appropriate, warpage deformation occurred, and it was not possible to obtain a resin molding with high dimensional accuracy.

In the case of the comparison example 4, results are average surface roughness of 50 μm, poor image clarity and good evaluation (○) for shrinkage and warpage.

Therefore, it is considered that although warpage deformation of the resin molding was avoided, from the results of average surface roughness and image clarity, suppression of lifting of the fibrous filler (A) was not possible, and it was not possible to obtain a resin molding with good appearance.

In the case of the comparison example 5, results obtained are average surface roughness of 30 μm, poor image clarity and good evaluation (○) for shrinkage and warpage.

Therefore, as is the case of the comparison example 4, it is considered that although warpage deformation of the resin molding was avoided, from the results of average surface roughness and image clarity, suppression of lifting of the fibrous filler (A) was not possible, and it was not possible to obtain a resin molding with good appearance.

[Modifications]

Specific embodiments of the present invention have been described herein, however the present invention is not restricted within the aforementioned methods, but various modifications or improvements may be included in scope of the invention.

The temperature control mechanism, die temperature control pipe, and cooling jacket described in the embodiments mentioned above to exemplify methods for controlling die temperature do not constitute a limit of the present invention. For example, as methods for controlling die temperature, a method for circulating heating medium in the die, a method for heating electrically such as resistance heating, dielectric heating and the like, a die that incorporates heating method in its body may be adopted. Alternatively, such a method that heats die surface selectively for gas flame heating from die surface side may be adopted. Further, for cooling, such a method that circulates a cooling medium in the die may be adopted.

Further, in each of the foregoing embodiments, antioxidant, antistatic agent, ultraviolet absorber, light stabilizer, flame retarder, flame-retardant additives, pigment, dispersant, nucleator and the like may be added as necessary to the resin composition.

Further, the method for molding a resin molding to which fibrous filler (A) is added is not limited to each of the foregoing embodiments. For example, vacuum pressure molding and the like may be adopted. In other words, any molding method is acceptable so long as a die is used.

INDUSTRIAL APPLICABILITY

The present invention may be used for resin moldings to which fibrous filler is added and molding method thereof, and utilized in automobile and housing facility industries and the like where rigidity and appearance are required. Particularly, the present invention may be used in the automobile industry for instrumental panel parts, door parts, body panel, floor lid, side steps and the like. Further, the present invention may be used in the housing facility industry for prefabricated bath parts, assembled furniture, doors, roads, railroad sound-proof walls and the like.

The invention claimed is:

1. A molding method for manufacturing a resin molding by charging a resin composition comprising fibrous filler (A) and crystalline resin (B) in molten state into a die by injection, the resin composition comprising not less than 7 wt % to less than 30 wt % of the fibrous filler (A) and more than 70 wt % to not exceeding 93 wt % of the crystalline resin (B), the method comprising:

charging the resin composition in a molten state into the die when a temperature of the die is in a range of Vicat softening point −20° C. to less than a melting point of the resin (B), thereby shaping the resin composition, after the resin composition is shaped, holding the temperature of the die for a predetermined time in a temperature range from a crystallization temperature −10° C. to the crystallization temperature +10° C. of the crystalline resin (B), and cooling down the die to a temperature which allows taking-out of a molded product.

2. The molding method according to claim 1, wherein shaping of the resin composition is performed when a temperature of the die is in the range of the Vicat softening temperature −10° C. to the melting point −10° C. of the resin (B).

3. The molding method according to claim 1, wherein the temperature range for said holding is from the crystallization temperature −10° C. to the crystallization temperature of the resin (B).

4. The molding method according to claim 1, wherein the resin composition comprises 10 wt % or more and 25 wt % or less of the fibrous filler (A).

5. A resin molding manufactured by the molding method of claim 1.

6. The resin molding method according to claim 1, wherein the crystalline resin is polyolefin resin.

7. The resin molding method according to claim 1, wherein the predetermined time is from 10 to 300 seconds.

8. The resin molding method according to claim 1, wherein the predetermined time is from 30 to 200 seconds.

9. The resin molding method according to claim 1, wherein the fibrous filler (A) has a fiber diameter of less than 25 μm.

* * * * *